UNITED STATES PATENT OFFICE.

HERMANN GRUBER, OF LEIPZIG-PLAGWITZ, GERMANY, ASSIGNOR OF ONE-HALF TO FRITZ SCHULZ JUN. AKTIENGESELLSCHAFT, OF LEIPZIG, GERMANY, A CORPORATION OF GERMANY.

PROCESS OF PURIFYING CLAY, &c.

1,036,831.      Specification of Letters Patent.      Patented Aug. 27, 1912.

No Drawing.      Application filed September 7, 1911. Serial No. 648,240.

*To all whom it may concern:*

Be it known that I, HERMANN GRUBER, a citizen of the Empire of Germany, and a resident of Leipzig-Plagwitz, Kingdom of Saxony, Germany, have invented certain new and useful Improvements in Processes of Freeing Aluminum Silicates, Kaolin, and the Like from Iron, of which the following is a specification.

This invention has reference to a novel process of freeing aluminum silicates, kaolin and the like from iron.

The silicates of aluminum, kaolin and like materials are found in nature in a rather impure state and contain larger or smaller quantities of iron compounds particularly iron oxids. It is known that such raw products may be freed from iron compounds by means of mineral acids such as hydrochloric acid, sulfuric acid or sulfurous acid. Such method is impractical in so far as it requires large quantities of acid which must be washed out when the process is finished and heat is also applied during the carrying out of same. For the above reasons these methods are not applicable for practical purposes and merely inferior materials of relatively low value are to be treated thereby which do not allow of employing methods incurring considerable expense or involving arduous labor.

The novel process forming the subject matter of this invention overcomes the described deficiencies and is carried out at relatively low cost, in a short time, and without the application of heat. According to my novel process the raw material containing iron as an impurity is first stirred into water to which but a small quantity of mineral acid has been added and then hydrosulfurous acid or its salts are added in a small quantity at ordinary temperature.

To free clay, for instance from the iron contained therein the raw material is stirred into twice its weight of water which has been acidulated by some mineral acid and then a small quantity of hydrosulfurous acid or its salts is added.

In order to purify 100 kilos of silicate of aluminum, for instance, same are stirred into 200 kilos of water containing 200 grams of concentrated sulfuric acid of 66° B. and 200 grams of sodium hydrosulfite. In the course of about ½ hour a raw material is obtained which is completely free from iron. When the purified material has settled, the liquid above same, which consists principally of a very dilute solution of sulfate of iron, may be easily decanted without loss of purified material. The reaction takes place according to the following equation:

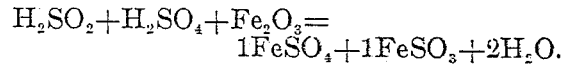

The hydrosulfurous acid or compound or salt reduces the triatomic iron to diatomic iron. At the same time the hydrosulfite is oxidized to a sulfurous compound, for instance according to the equation:

The iron sulfite is transformed in the presence of sulfuric acid into sulfate and the sulfurous acid set at liberty acts again *in statu nascendi* on more of iron oxid as a reducing and dissolving agent. This is repeated until, at the end of the reaction, all iron has been transformed into sulfate.

I claim as my invention:

1. The process of freeing aluminum silicates, kaolin and like products from iron consisting in subjecting said products at ordinary temperature to the action of a small quantity of a hydrosulfurous compound in the presence of acidulated water.

2. The process of freeing aluminum silicates, kaolin and like products from iron consisting in subjecting said products at ordinary temperature to the action of a small quantity of a hydrosulfite in the presence of acidulated water.

3. The process of freeing aluminum silicates, kaolin and like products from iron consisting in subjecting said products at ordinary temperature to the action of a small quantity of sodium hydrosulfite in the presence of acidulated water.

4. The process of freeing aluminum silicates, kaolin and the like from iron consisting in stirring the material into twice its weight of water containing some mineral acid and then adding at ordinary temperature a small quantity of a hydrosulfite.

5. The process of purifying aluminum silicates, kaolin and the like from iron consisting of stirring 100 kilos of the material into 200 kilos of water containing 300 grams of concentrated sulfuric acid and adding 200 grams of sodium hydrosulfite, allowing the mass to settle and decanting the liquid above same.

Signed at Leipzig, Germany, this 23rd day of August 1911.

HERMANN GRUBER.

Witnesses:
R. WESTACOTT,
E. J. SYMONDS.